United States Patent [19]

Studly

[11] 3,745,903
[45] July 17, 1973

[54] VIEW OR PROCESS TYPE CAMERA
[76] Inventor: Adolph Studly, R.D. No. 1, Fels Road, Box 74, Pennsburg, Pa.
[22] Filed: June 23, 1971
[21] Appl. No.: 155,804

[52] U.S. Cl. .......................................... 95/51, 95/45
[51] Int. Cl. ............................................. G03b 5/02
[58] Field of Search ...................... 95/12, 2, 38, 45, 95/46, 51

[56] References Cited
UNITED STATES PATENTS

| 692,610 | 2/1902 | Brownell | 95/46 |
| 1,535,225 | 4/1925 | Hays | 95/45 |
| 2,413,058 | 12/1946 | London | 95/38 |
| 2,204,819 | 6/1940 | O'Brien | 95/38 |
| 897,733 | 9/1908 | Goddard | 85/51 |
| 744,024 | 11/1903 | Brehm | 95/46 |
| 2,293,598 | 8/1942 | Drucker | 95/51 |
| 1,984,420 | 12/1934 | Moulin | 95/12.2 |
| 766,389 | 8/1904 | Russell | 95/12.2 |

FOREIGN PATENTS OR APPLICATIONS

| 446,463 | 3/1949 | Italy | 95/51 |

Primary Examiner—John M. Horan
Attorney—Shaffert & Miller

[57] ABSTRACT

Disclosed is an improved view or process camera characterized by a front, lens carrying section that is larger than the back, film or ground glass carrying section, with appropriately tapered bellows joining the two sections. Additionally, the rear frame section of the camera is flared outwardly in a direction toward the front of the camera in order to accommodate the bellows as it bunches and sags during adjustment of the camera front or back section. This feature allows a much wider range of adjustment of the front and/or back section of the camera without allowing the distorted bellows to interfere with the light rays passing from the lens to the film plate. Also disclosed is an improved camera structure allowing a greater degree of freedom in adjusting the components of the camera relative to each other. Also disclosed is an improved lens carrying board with a rotatable lens disc that allows the lens to be adjusted relative to the ground glass or film plate in the camera. Other features disclosed will become apparent from a reading of the following disclosure.

12 Claims, 16 Drawing Figures

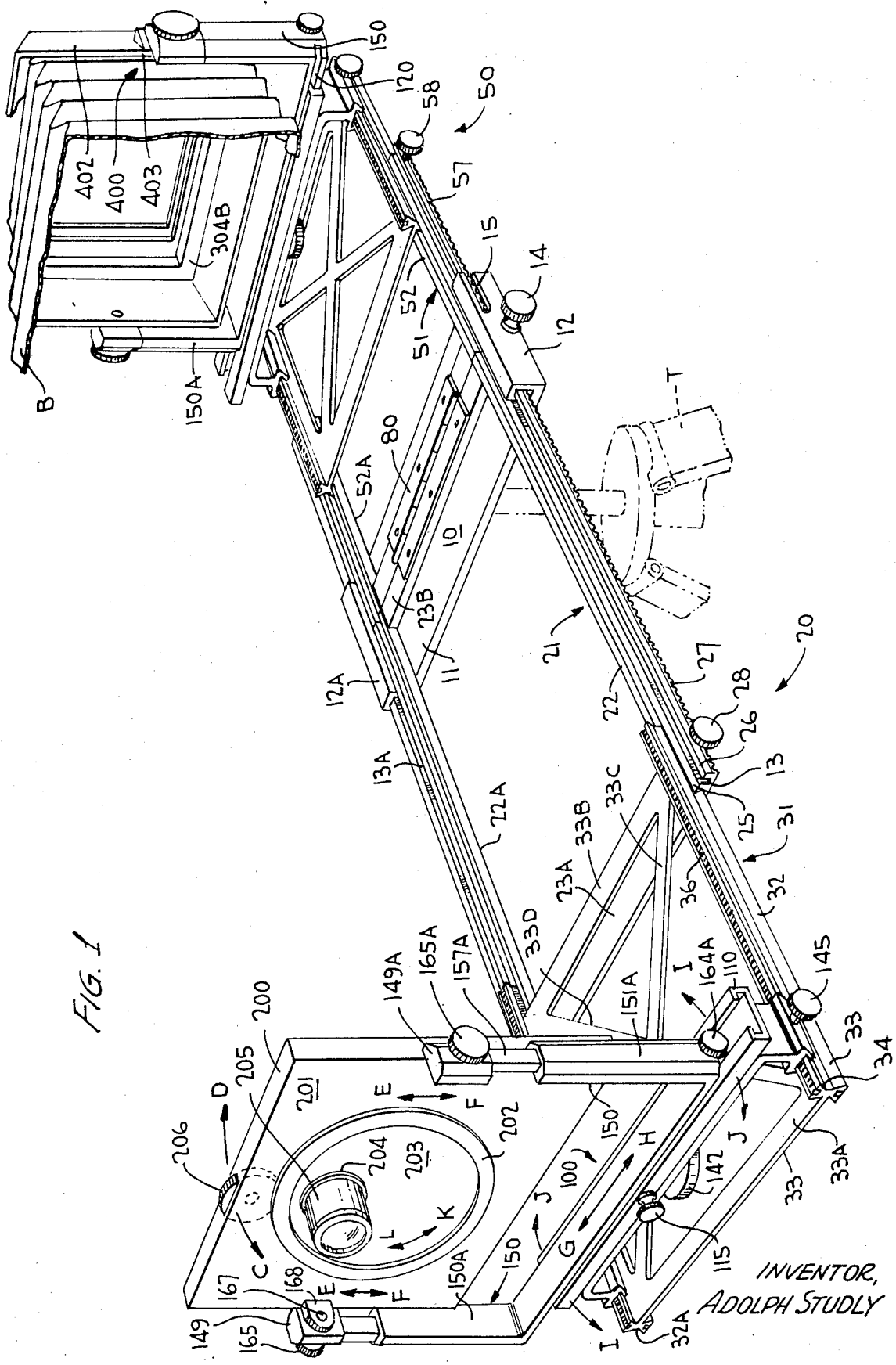

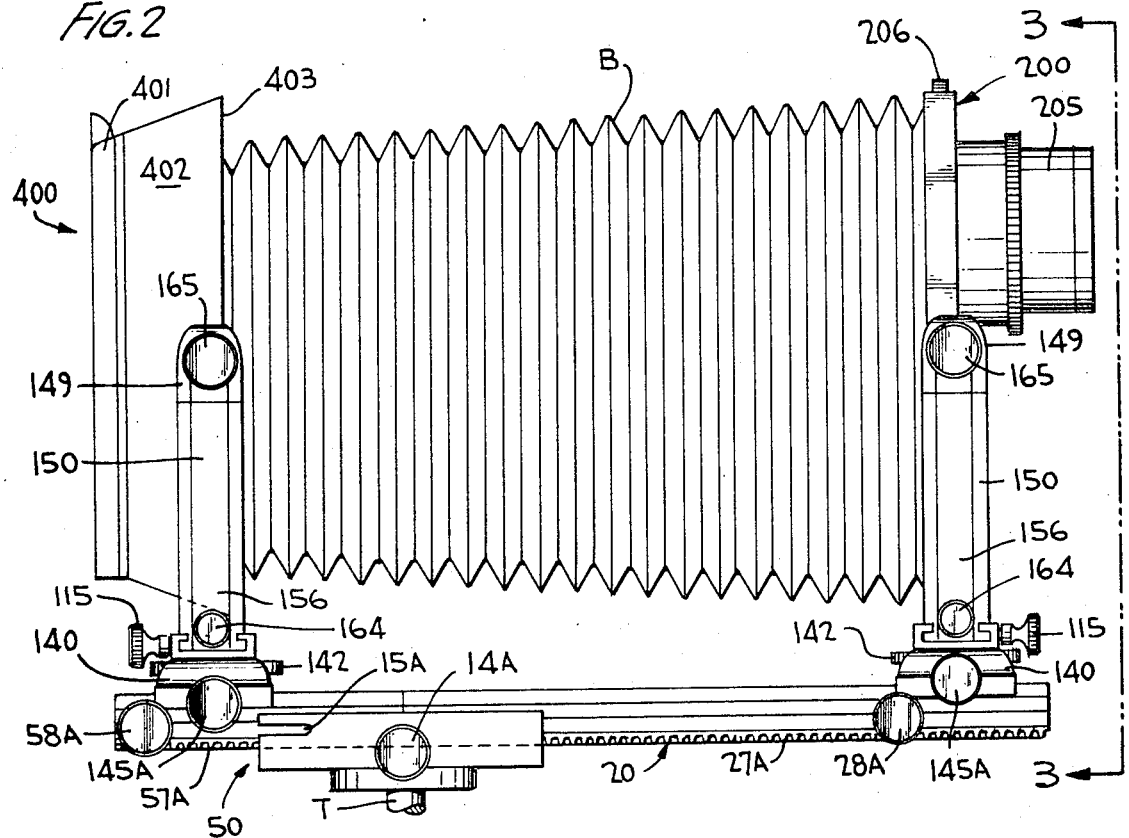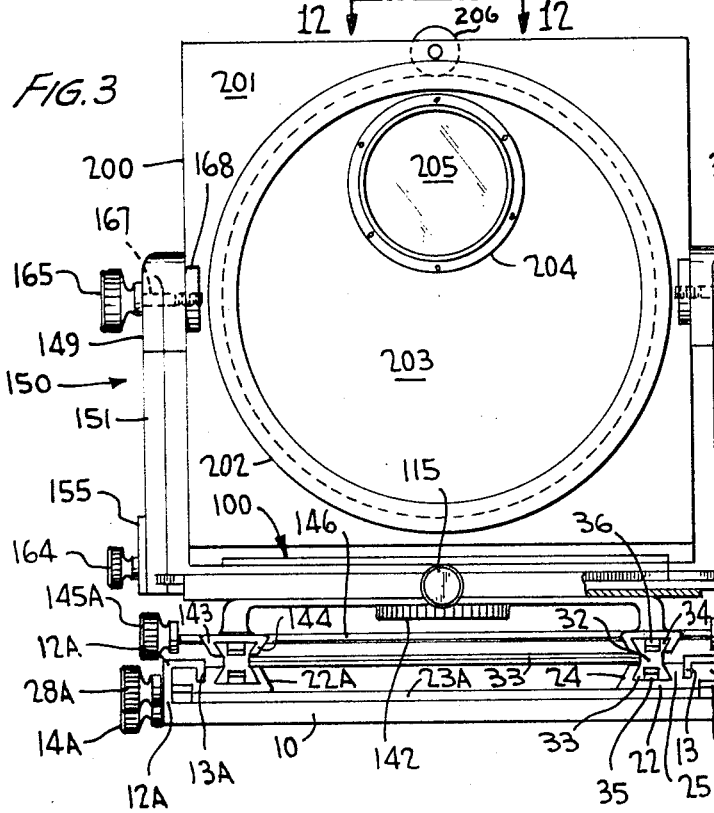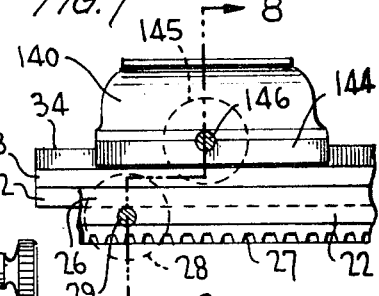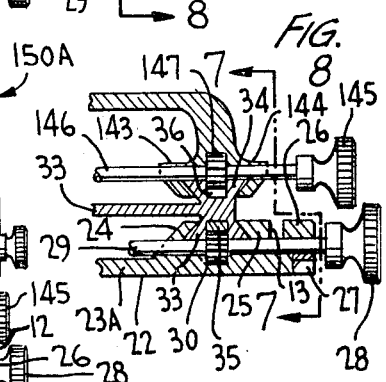

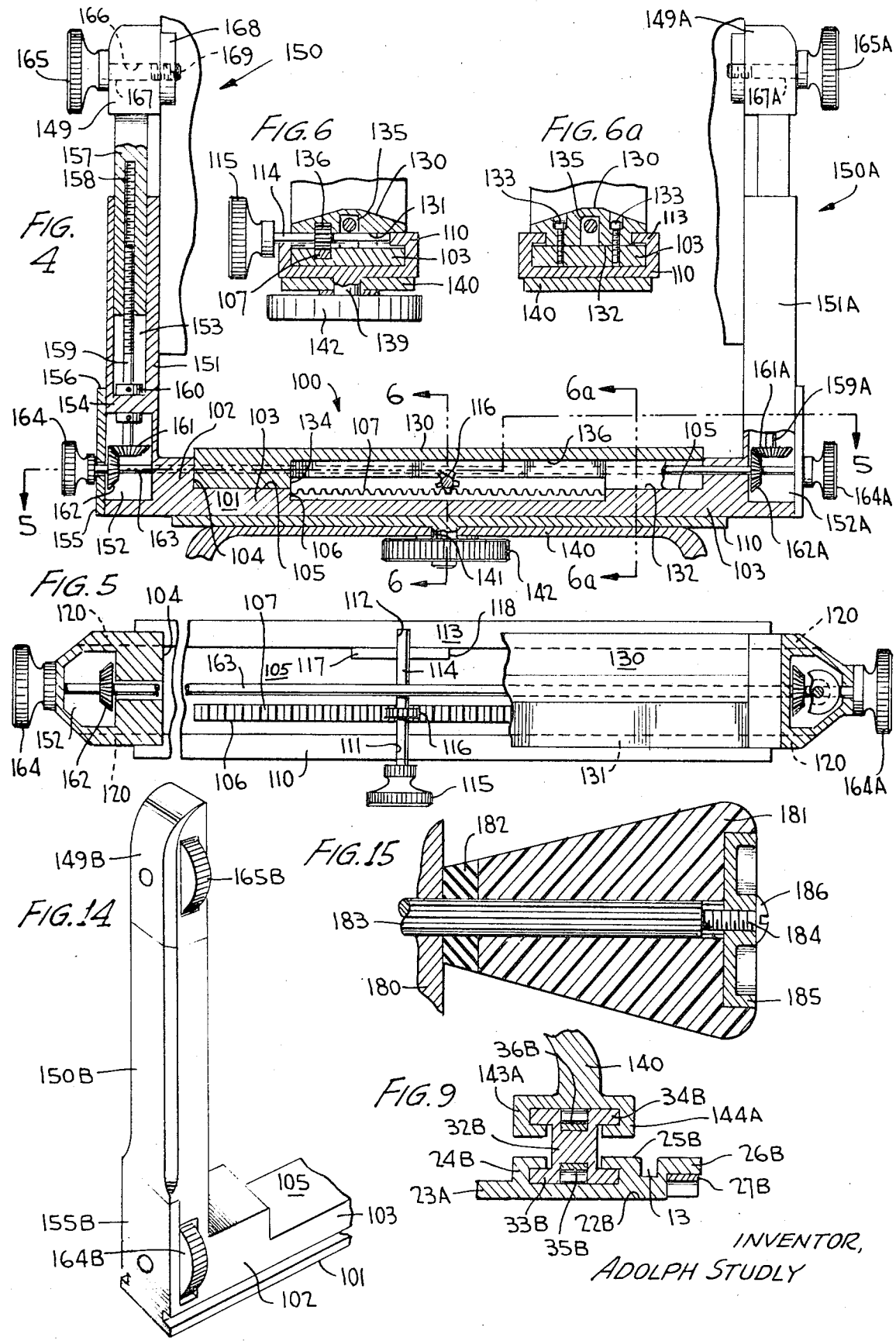

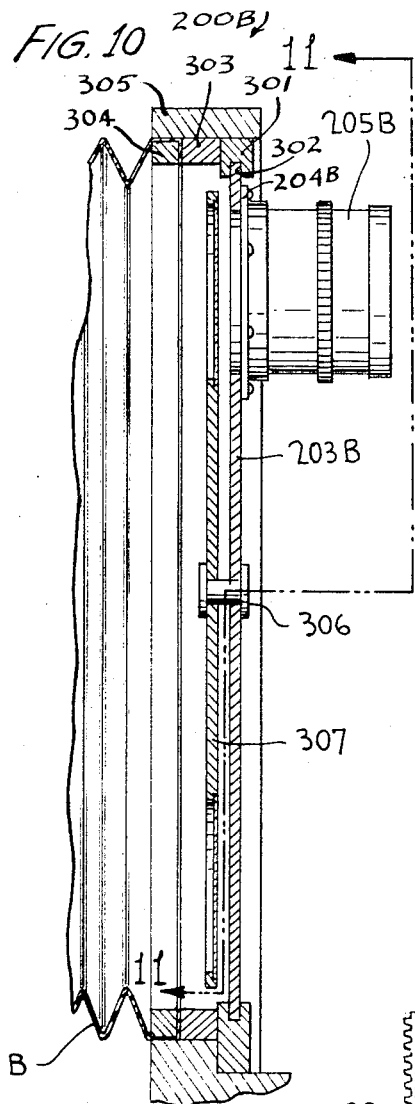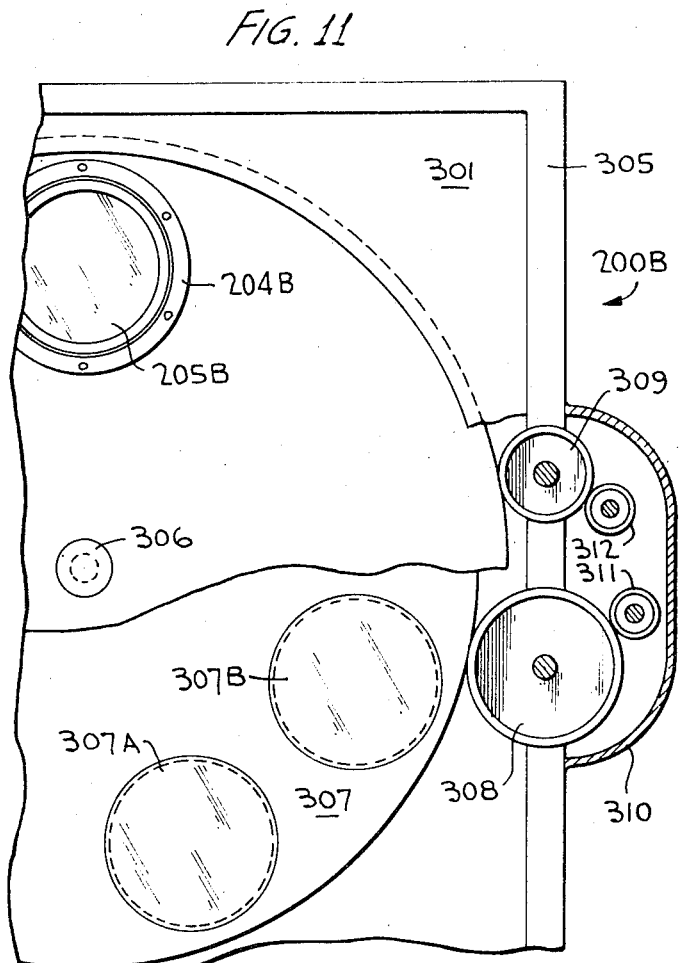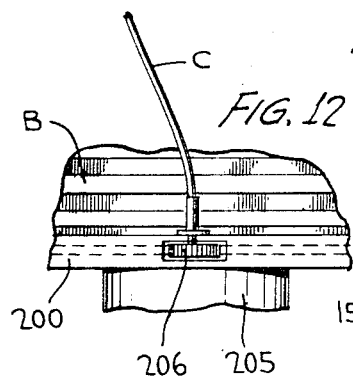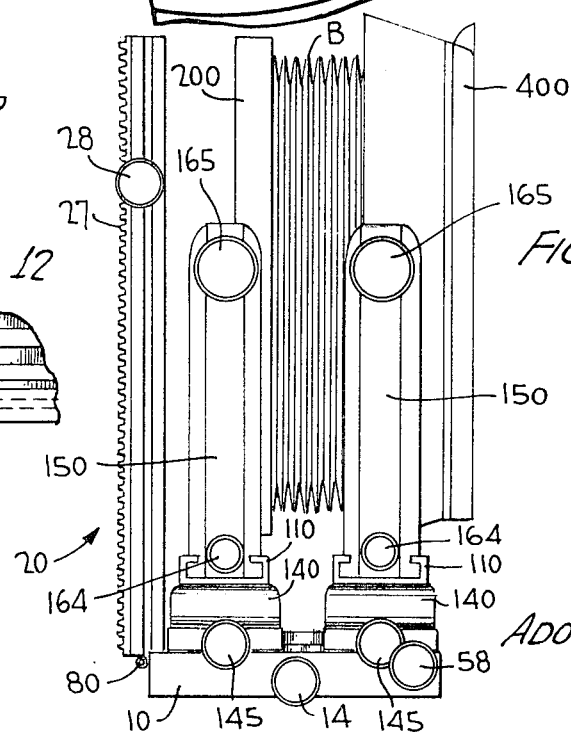

VIEW OR PROCESS TYPE CAMERA

BACKGROUND OF THE INVENTION

View cameras are a type or classification of camera used by the professional photographer or by the serious amateur photographer.

View cameras are characterized by several basic elements or components. A camera bed or base is generally arranged in a manner that will allow it to be extended so that the distance between a lens carrying front section and a film or ground glass carrying section may be adjusted relative to each other as desired.

The front section of the view camera generally consists of a lens carrying board supported by a double, upstanding arm support and the entire assembly possesses a number of degrees of freedom so that the lens may be adjusted to a wide variety of positions. Typical adjustments of the lens and lens board include an up and down adjustment, a lateral adjustment from side to side, a forward and backward adjustment about a pivot point passing through the lens board, and a swing or rotary adjustment about an axis normally vertical to the ground.

A similar supporting frame is provided for the back section of the camera and many degrees of adjustment are also possible for the back section of the view camera. It is this section of the camera that carries the ground glass used in focusing the camera. The film pack or film plate is also carried by the back section of the view camera and, after the camera is properly focused, the film is placed in the position previously occupied by the focusing ground glass.

The front section of the camera is joined to the back section of the camera by an expandable bellows. The bellows is generally formed of a rubber or plastic-coated fabric and must, of course, be completely free of light leaks. It is quite common for the bellows of presently available view cameras to taper so as to become smaller in the direction of the front section of the camera.

Conventional view cameras have a removable lens plate on the front section of the view camera with a centrally located aperture or lens flange of standard lens size. Thus, different lenses may be interchangeably used with a conventional lens board simply by inserting or removing them from the hole through the lens board.

Conventional view cameras come in a number of sizes and a conventional method of indicating the size of the view camera is to express, in inches, the two dimensions of the film plate accepted by the back section of the camera. Thus, well known view cameras are generally available in the following ranges: 2 ¼ × 3 ¼ inches; 4 × 5 inches; 5 × 7 inches; 8 × 10 inches; 11 × 14 inches; 16 × 20 inches; and so on up to as much as 48 × 60 inches for certain specialty types of cameras.

Cameras that are large enough to fall in the upper portion of the size range just discussed are sometimes referred to as "process cameras." Process cameras are generally employed in the printing industry, particularly in the photographic reproduction of material to be printed by the offset process and the preparation of copies of drawings and the like by the lithographic process.

The degrees of adjustment possible with a view camera are useful in a number of different applications. If the portion of the camera carrying the film is not parallel with the subject to be photographed, a distorted image will be recorded by the camera. For example, tall buildings will appear to taper and slope backwards, and objects closer to the camera will photograph disproportionately larger relative to other objects in the field. To correct these distortions, the film must be parallel to the vertical lines of the subject.

Several of the adjustments obtainable with a view camera are as follows. A "down-angle" adjustment (front section lower than back section) or "up-angle" adjustment (front section higher than back section) permits special photographic effects. For example, the "up-angle" adjustment is often used in photographing buildings. Horizontal and vertical swings (or pivots) permit an adjustment of the depth of field to sharpen the image of an object nearer to one side of the lens. The rise and fall of the lens carrying board permits the elimination of "foreground objects" from the image and the lateral or side shift of the camera front or back permits an adjustment of the image position without shifting the entire camera. Other uses will become apparent in the following discussion of the operation of my camera.

A number of disadvantages exist with presently available view cameras.

For those cameras that have a bellows that tapers towards the front section of the camera, a serious problem is one of light ray obstruction by the sag or bunching of the bellows. Very often, when the front and back sections of the view camera are positioned at various angles to each other, the bellows itself is extended or contracted and twisted in a manner that will block or obstruct the rays of light passing from the lens to the focusing ground glass or film plate. Such obstruction will, of course, limit the field obtainable on the film plate itself.

An additional problem in presently available view cameras is caused by the fact that the lens itself is located in the geometric center of the lens board that forms a portion of the front part of the view camera. In certain types of photographic work such as the photographing of drawings, documents, paintings and similar art work that must be reproduced completely free of distortion, the central location of the lens often requires extensive and time consuming shifting of the entire front section of the camera.

An additional problem attributable to the construction of presently available view cameras is attributable to the types of adjusting mechanisms provided for front and back section adjustment. Because both sides of the support frame function independently from each other, the front or rear section of the camera will often wedge or bind as it is being raised or lowered. Additionally, many conventional view cameras employ a ratchet type of device to hold the front section or back section of the camera in an elevated position. These ratchets are undependable and often drop or inadvertently release the camera section when the camera or camera tripod is jarred.

Some currently available view cameras employ a single rail or mono-rail system for the adjustment of the front section of the camera relative to the back section of the camera. Speaking from practical experience, I find that a mono-rail is not as steady as a double rail and in many cases where a photographer has to position his camera immediately at the edge of an architectural scale model at eye level, the lens cannot be brought close enough to the scale model to avoid the inclusion of the image of the mono-rail in the center of the picture. Thus, the eventual photograph must be trimmed or cropped to eliminate the image of the mono-rail as it is superimposed on the image of the architectural scale model. Other problems inherent in conventional view cameras will become apparent later in the discussion.

SUMMARY OF THE INVENTION

My improved view camera provides many distinctive advantages over presently available commercial view cameras.

Although my view camera as disclosed herein consists of the basic parts of a view camera such as a front, lens carrying section, a back, film carrying section, an expandable bellows joining the front and back section, front and back section support members capable of movement and adjustment in several planes of motion, and means by which the front section and the back section of the camera may be positioned relative to each other, nevertheless certain individual features of my camera provide improved performance and versatility.

The front or lens section of my camera is larger than the rear section which holds the ground glass and the film. A larger front section will permit a more extreme adjustment of the front section of the camera relative to the back section without having the bellows obstruct the line of light rays passing between lens and film.

Frequently, the bellows is twisted or distorted out of shape when the front or lens section of the camera is raised or moved laterally from side to side. In order to avoid the obstruction of the light rays in the immediate vicinity of the film plate by a bunching of the bellows at its point of attachment on the rear section of the camera, I have provided a rear frame member having a flared configuration. Thus, the front section of the camera may be raised, lowered, and moved from side to side to a degree greater than previously obtainable with conventional view cameras while at the same time avoiding the obstruction of the film plate.

The front section of my view camera contains a lens disc which is rotatable 360° about an axis passing through and perpendicular to the center of the front section of the camera. The lens flange is positioned on but near the outer edge of the disc and thus the lens may be shifted into any position on the front section of the camera without a concomitant shifting of the camera off center.

This feature of a revolving lens disc is particularly useful in the photographing of tall buildings when the camera must be positioned in a narrow street. In such a situation, a wide angle lens must be used and the bellows must be contracted to the point where the front section of the camera is positioned very close to the back section of the camera. With the bellows thus contracted, the movement of a conventional view camera front section is impaired, particularly when the lens must be shifted upwardly to include the top of the building within the photographic image projected on the film. With the lens disc of my camera, such a photograph may be made by simply turning the lens disc so that the lens is at its highest point relative to the front section of the camera.

When employed in larger cameras, sometimes known as process cameras, the lens disc may be made proportionately larger and may be adapted for photo offset and lithographic processes. As for example, the rotatable lens disc may be moved in a manner that will permit the placement of the image on an isolated portion of the film or plate surface, thereby permitting multiple copying of black and white and/or color separation plates.

In a modification of the camera of my invention, a separate filter disc may be equipped with a multiple port filter turret that will allow a quick and speedy change of filters in color separation work. The filter disc itself may be placed behind the lens disc and may be independently rotated to permit the changing of the various filters relative to the lens or may be simultaneously rotated with the lens to accommodate the rotation of the lens disc itself.

Both the lens disc and the filter disc may be rotated by friction wheels which are each attached to flexible driving cables and powered by electrical motors which have their operative controls positioned in the area of the back of the camera. Thus, the photographer will be able to position the lens from the rear of the camera as he is observing the image on the ground glass.

Both the front section and the back section of my view camera are supported by a similar supporting frame. This frame possesses a number of mechanisms that permit a wide range of adjustment so that either the front section or the back section may be positioned at will. The section of the camera itself is mounted between two upstanding arms that are joined at the base by a support frame base member. For convenience in explanation, the mounting frame will be briefly discussed with reference to the front plate of the camera although it is to be understood that a similar support member exists for the back section or film holding section of the camera.

The front plate of the camera itself is joined to the two upstanding arms by pivot points passing through the sides of the front plate. This permits the front plate to be adjusted in an angular manner around the axis passing through the pivot points and to be locked in place.

The two supporting arms that are positioned on either side of the front plate are in themselves extendible by means of a telescoping height extending arm. By means of a knurled knob located towards the bottom of each of the support arms, the entire front plate of the camera may be raised or lowered. All the control knobs on the camera are constructed in a manner that will permit them to be locked when the desired adjustment has been obtained.

The two supporting arms are themselves supported by a support frame base member which is mounted on a lateral track. The cooperation of the base member and the lateral track permits the entire front plate to be shifted laterally from side to side independently of any side to side motion of the camera bed itself.

In addition to providing a track for lateral movement, the lateral track member is also attached to a depth track following member in a manner that will permit the entire front plate and supporting arm structure to be pivoted clockwise and counter-clockwise about an axis parallel with and midway between the two front plate supporting arms.

Finally, the entire assembly may be shifted forward and backward in a manner that will permit the adjustment of the distance between the front plate and the back plate, thereby permitting the camera to be precisely focused regardless of the type of lens used in the lens disc.

I have also disclosed herein a shaft adjusting knob that permits easy adjustment of the various mechanisms of the camera yet provides a means whereby the knob may be easily locked relative to the camera frame.

DESCRIPTION OF THE DRAWING

FIG. 1 is a perspective view of my camera with the bellows cut away and illustrating the tracks in their extended condition, the front plate shifted to the left and raised in its support, and the back assembly laterally shifted to the right.

FIG. 2 is a side view of my camera showing the front track bed assembly and back track bed assembly locked together by the track locking tripod mount and with the front and back assemblies of the camera positioned at the outer extremities of these track bed assemblies when not extended.

FIG. 3 is a front view of my camera taken on the line 3—3 of FIG. 2, with a portion of the lateral track shown in section.

FIG. 4 is an elevation view of the front plate support frame of my camera with portions of the frame shown in section.

FIG. 5 is a top view of the support frame base member taken on section line 5—5 in FIG. 4, but shown in larger scale.

FIG. 6 is a sectional view taken on line 6—6 of FIG. 4.

FIG. 6A is a sectional view taken on line 6A—6A of FIG. 4.

FIG. 7 is a side view of the camera bed track structures taken on line 7—7 of FIG. 8.

FIG. 8 is a cross-sectional view of the upper and lower rack and pinion controls in the camera bed tracks, taken on a line passing through both the upper and the lower pinion gears.

FIG. 9 is a sectional view of a modified camera bed track.

FIG. 10 is the side view of a modification of my camera illustrating a multi-station filter disc.

FIG. 11 is a portion of a front view of a modification of my camera taken on line 11—11 of FIG. 10.

FIG. 12 is a top view of the lens disc control button taken on line 12—12 of FIG. 3.

FIG. 13 is a side view of my camera as it appears when folded.

FIG. 14 is a perspective view of a modification of the right or left upstanding front plate support.

FIG. 15 is a cross-sectional view of the locking mechanism of a modified camera control knob.

DESCRIPTION OF A PREFERRED EMBODIMENT

A preferred embodiment of my improved view or process camera will now be described. Reference will be made to the accompaning drawings to facilitate a full understanding of my device.

The view camera disclosed herein is a mechanism that includes three main sub-assemblies. These sub-assemblies are a camera bed including extendible camera bed tracks; a front assembly including a lens carrying front plate or lens board and; a rear or back assembly adapted to carry a ground glass focusing plate and the film pack or film plate employed to record the image projected thereon. It is noted that both the front assembly and the back assembly are supported by the same type of supporting frame. To facilitate an understanding of the camera disclosed herein, these sub-assemblies will be discussed individually and then the cooperation between the sub-assemblies will be discussed.

With particular reference to FIG. 1, the camera of my invention is shown in an extended position and being supported by a tripod T shown in dotted lines.

Tripod T may be attached to a standard tripod fitting that is located on the underside of track locking tripod mount 10. This mount is an element having a flat, rectangular shaped center or bridging member 11 of a width slightly greater than the width of the subsequently discussed camera bed tracks. Attached to or integrally formed with the edges of mount 10 that lie parallel to the camera bed tracks are two C-shaped gripping elements 12 and 12A which are configured in a manner to cooperate with grooves 13 and 13A, respectively, that run along the outer edges of the camera bed tracks.

The camera bed itself consists of a front track assembly 20 and a back track assembly 50. These two assemblies are joined by hinge 80 so that the camera may be folded (see FIG. 13) for easy portability. Both track assemblies have essentially the same cross-sectional configuration although some details such as control knob locations and track length vary somewhat between the front track assembly 20 and the back track assembly 50. For ease of discussion, the parts common to both tracks will be discussed with reference to front track assembly 20.

The front track assembly 20 has a stationary base track assembly 21 and an intermediate front extendible track assembly 31. The track assembly 21 has side rails 22, 22A that are positioned parallel to each other and the distance between the side rails defines the width of the camera bed itself. Rails 22 and 22A are joined and supported at their ends by cross members 23A and 23B in a manner so that rails 22, 22A and ends 23A,23B form a rectangular front track assembly.

The cross-sectional configuration of side rails 22 and 22A are best visible in FIG. 8 and, for a modification thereof, in FIG. 9. The side rails are attached to opposite sides of cross member 23 and each side rail is configured essentially the same although one is a mirror image of the other. Side rail 22 will be described with reference to FIG. 8 wherein it can be seen that rail 22 has a triangularly-shaped recess formed between two inclined gripping flanges 24, 25. Both of these flanges are mounted on or formed integrally with cross member 23A. At the very edge of rail 22 is another upstanding protrusion 26 and the space formed between flange 25 and element 26 provides the track for the C-shaped gripping element 12 on the track locking tripod mount 10.

A similar configuration may be seen in FIG. 9 although the modified track of FIG. 9 has a T-shaped track and rail configuration as opposed to a triangular track and rail configuration. The track shown in FIG. 9 gives an unobstructed view of flanges 24B and 25B formed on rail 22B because FIG. 9 is a sectional view taken at a location other than the location of the pinion controls shown in FIG. 8.

A metal toothed rack 27 (see FIG. 1 and 7 and rack 27A in FIG. 2) is positioned below upstanding element 26 with the teeth of rack 27 pointing in a downwardly direction. This rack runs substantially the full length of said rail 22 and meshes with the pinion controlled by control knob 14 which itself is located on track locking tripod mount 10. Rotation of control knob 14 will permit the entire camera bed to be shifted relative to the tripod in a manner to be subsequently described. A similar relationship exists between knob 14A and rack 27A.

Front extendible track assembly 31 consists of two parallel side rails 32 and 32A which are supported by cross bracing member 33 at a distance from each other corresponding to the distance between the mating rail grooves in side rails 22 and 22A of the base track 21. Cross brace member 33 may be of any convenient shape as long as it rigidly supports rails 32 and 32A. As illustrated in FIG. 1, cross brace 33 may consist of end bracing struts 33A and 33B and diagonal cross bracing struts 33C and 33D. Rail 32 has a cross-sectional configuration somewhat like an hourglass and has a lower triangularly-shaped track portion 33 and an upper triangularly-shaped track portion 34. The modified track illustrated in FIG. 9 is similarly numbered using the same reference numerals followed by the letter "B." It is noted that the modified track of FIG. 9 has a generally T-shaped upper and lower rail portion rather than the triangularly-shaped rail portions illustrated in the other figures.

Both the top surface and the bottom surface of rail 32 are grooved to receive a metal geared rack similar to rack 27 previously described. Rack 35 is mounted in the groove formed in triangular portion 33 and the teeth of rack 35 point downwardly towards stationary base track assembly 21. In a similar manner, rack 36 is fixedly positioned in the groove on triangular portion 34 of rail 32 with the teeth pointing in an upward direction. It is to be emphasized that all of the elements just described in relation to track 32 similarly exist on track 32A that forms the other side of the intermediate front extendible track assembly 31.

Two control knobs 28 and 28A are located on opposite sides of a control shaft 29 which passes through stationary base track assembly 21 in a manner best visible in FIGS. 7 and 8. Suitable bearing surfaces are provided at the points where base track assembly 21 contacts shaft 29 and, as is apparent in FIG. 8, a pinion 30 is fixedly mounted on shaft 29 in a position that will cooperate with rack 35 located on the front extendible track assembly 31. Note that a small clearance is formed in side rail 22 to accommodate pinion gear 30. A similar pinion gear will be fixedly mounted on the opposite end of shaft 29 in a position that will enable it to cooperate with the metal rack located on the underside of rail 32A. Finger knob 28A is positioned on the other side of shaft 29. The rotation of either or both of knobs 28, 28A will produce a rotation of shaft 29 and the two pinion gears located thereon. Again, it is emphasized that only pinion 30 is illustrated in FIG. 8 but an equivalent pinion gear 30A would be provided on the opposite side of shaft 29 and would cooperate with the rack located on rail 32A. When pinion gears 30 and 30A are rotated by turning knob 28 and 28A, the entire front extendible track assembly 31 will slide along the triangular groove provided by flanges 24 and 25 on rail 22. It is noted, of course, that equivalent flanges 24A and 25A on rail 22A will provide the groove for rail 32A. In this manner, the entire front extendible track assembly 31 may be moved along tracks 22 and 22A of stationary base track assembly 21. It is noted that the rear or back track assembly 50 has equivalent base track assemblies 51 and back extendible track assembly 61 and by rotation of control knob 58, the back extendible track assembly 61 may be moved back and forth in the grooves provided in the stationary base track assembly 51. Knob 58 is mounted in the two side rails of assembly 51 in the same manner that knob 28 is mounted in side rails 22 and 22A of assembly 21. Another knob 58A is placed on the opposite side of the camera bed (visible in FIG. 2) so that the back extendible track assembly 61 may be adjusted from either side of the camera.

It is noted that both rails 52 and 52A have cross-sectional configurations that correspond to their equivalent rails 22 and 22A on the front track assembly. Similarly, rails 52 and 52A both have a downwardly pointing metal rack 57 and 57A attached thereto and positioned in the same relative position as rack 27 of rail 22. With particular reference to FIGS. 1 and 2, the front stationary base track assembly 21 and the rear stationary base track assembly 51 are the same size and the same configuration so that they may form a continuous rail when the hinge 80 joining the two assemblies is fully open as shown in FIG. 1. Track locking tripod mount 10 has mounted therein a rotatable shaft joining thumb knobs 14 and 14A. In a manner similar to that described with reference to knobs 28, 28A and shaft 29 and pinion 30, two pinions are mounted on the shaft-joining knobs 14 and 14A in such a location that they may mesh with racks 27 and 57 on one side of the camera bed and racks 27A and 57A (FIG. 2) on the other side of the camera bed. When the track locking tripod mount 10 is in the position shown in FIGS. 1 and 2, it serves to lock the two track assemblies 20 and 50 to each other by bridging the two end bracing elements that are attached to each other by hinge 80. The rotation of knobs 14 and/or 14A will shift the entire camera assembly relative to the track locking tripod mount 10 and the tripod T itself. Such a shift is useful to balance the camera on the tripod, even when the bellows are fully extended. Note that knobs 28 and 28A as well as knobs 58 and 58A serve as limit stops and define the extent to which the front and back track assemblies may be moved back and forth in the locking tripod mount 10. As is apparent, the C-shaped track following members 12 and 12A would not be able to pass by knobs 28 and 28A and 58 and 58A. I have provided slots 15 and 15A in the C-shaped track following members 12 and 12A for the purpose of accommodating the shaft joining knobs 58 and 58A so that the camera may be folded as shown in FIG. 13. It is noted that track locking tripod mount 10 would be positioned so that it encompasses rails 52 and 52A yet would be entirely clear of rails 22 and 22A. In this position, both the front and the back assembly of the camera may be positioned on the back track assembly 50 and the entire front track assembly 20 may be folded upwardly at hinge 80.

Rails 22, 22A, 32 and 32A may preferably be formed of metal and may be fabricated by machining, extrusion, or some other appropriate manufacturing process. Other manufacturing materials may be employed if they possess sufficient rigidity and stability to provide a smooth operating extendible track system. End cross members 23A and 23B may be attached to rails 22 and 22A in any conventional manner and, in like manner, cross brace member 33 may be attached to rails 32 and 32A in a conventional manner.

Both the lens carrying front plate of the camera and the film carrying back assembly of the camera are supported by a generally U-shaped plate support frame such as the one visible in FIG. 4.

The plate support frame has a base member designated generally by the numeral 100 that is substantially the same width as the camera bed and upstanding plate support arm 150 and 150A located at each end of base 100.

The upstanding plate support arm 150 on the left side of FIG. 4 is shown partially in section to illustrate the mechanism used to raise or lower the front or back plate of the camera. Similar reference numerals will be used for the same elements in each of the upstanding arms illustrated in FIG. 4 but, for purposes of clarity, reference numerals referring to the right-hand arm will be followed by the letter "A."

Upstanding arms 150, 150A consist of a lower portion 151, 151A and an upper portion 149, 149A, respectively. The upper portion 149, 149A houses the pivot control assembly that will be described in detail at a later point in this disclosure. With particular reference to the left-hand side of FIG. 4, the lower portion 151 of upstanding arm 150 has formed therein a gear chamber 152 and a height extending arm chamber 153 separated by a partition 154. Chamber 152 may be provided with a gear chamber cover 155 that may attach to the exterior portion of arm 150 as shown in FIG. 4 or which may be counter-sunk into arm 150 so that the ridge at 156 would be non-existent, as shown on the upstanding support arms of FIG. 1.

Height extending arm chamber 153 may be of any convenient cross-sectional shape. It is only required that height extending arm 157 have a configuration that will mate with chamber 153. For example, height extending arm 157 is illustrated in FIG. 1 as having a square cross-section, but a cylindrical or triangular cross section would work equally as well. Bore 158 is drilled in height extending arm 157 and is tapped with a thread cutting tool of a relatively coarse pitch to match the pitch of the threads cut on threaded rod 159. Threaded rod 159 passes through a bearing 160 which itself is on chamber separating partition or web 154. Rod 159 extends down through bearing 160 into gear chamber 152 and has beveled gear 161 fastened to the lower-most end of rod 159. Rotation of beveled gear 161 will result in a rotation of rod 159 and, as rod 159 turns, height extending arm 157 will raise or lower within height extending arm chamber 153. As is apparent from an inspection of FIG. 4, a similar rod 159A and beveled gear 161 exists in the gear chamber 152A formed in the other upstanding support arm. Bevel gears 161 and 161A are rotated by means of beveled gears 162 and 162A, both securely mounted on a common shaft 163. The exterior ends of shaft 163 are provided with finger knobs 164 and 164A and rotation of one or both of these knobs will cause portions 149 and 149A of the two upstanding arms to raise or lower as a function of the direction in which the finger knobs are turned. Because both mechanisms are linked to each other, the operation of the height extending mechanism operates very smoothly and binding or wedging of one of the arms independently of the other is eliminated as a problem. Gear 162 and 162A may be mounted on shaft 163 in a manner that the bevel faces in the same direction (as in FIG. 4) so that both rods 159 and 159A may have the same hand thread formed thereon. If desired, bevel gear 162A could be reversed from the position shown in FIG. 4 and in such a situation one of the arm raising threaded rods would have a right-hand thread and the other side would have a left-hand thread. Gears 162 and 162A may be larger than gears 161 and 161A in order to provide a gear ratio that permits a fast rise of the upper arms when the knobs 164, 164A are turned.

The uppermost portion 149 of control arm 150 is designated as a pivot control assembly. A pivot control knob 165 is attached to a threaded shaft 167. Shaft 167 passes through a bore 166 formed through pivot control assembly 149 and extends a sufficient distance beyond pivot control assembly 149 to enable it to engage a threaded bore 169 formed through front plate pivot tab 168. This tab is also visible in FIGS. 1 and 3 and provides the means whereby the lens carrying plate is attached to the U-shaped plate support frame. Knobs 165 and 165A are loosened to permit adjustment of the lens carrying plate in a direction indicated by the arrows C and D in FIG. 1. The surfaces of tab 168 and pivot control assembly 149 that are contacting each other are pressed together when thumb screw 165 is tightened so that the lens carrying plate may be locked in any given angular position after it is pivoted about the axis that passes through threaded rod 167 and threaded rod 167A.

The just-described mechanism located in the two upstanding support arms 150 and 150A permit either the lens carrying front board or the film carrying back frame to be raised and lowered in a direction indicated by arrows E and F (FIG. 1) and to be pivoted in the directions shown by arrows C and D (FIG. 1). Again, with reference to the left-hand side of FIG. 1, the plate supporting frame base member 100 includes components that permit adjustment of the front plate in several more modes of freedom such as a lateral or side-to-side motion indicated by arrows G and H and a clockwise and counter-clockwise swing or rotary movement as indicated by the arrows I and J. These additional components will now be described with particular reference to FIGS. 4, 5, 6 and 6A.

Upstanding arms 150 and 150A of the plate support frame are joined by a support frame base member and generally indicated by the reference numeral 100 in FIG. 4. This base member includes a number of basic components. An elongated rectangular-shaped connecting member 101 is attached to or integrally formed with the lowermost portion of both arms 150 and 150A. Reference is made to FIG. 14 wherein a modified support arm 150B (to be described later in this disclosure) is joined to connecting member 101. It is noted that member 101 is of a given thickness in a region designated as 102 located immediately adjacent to support arm 150B and is then a reduced thickness at the region indicated as 103 in FIG. 14. The surface forming the back of the step between section 103 and 102 is designated in FIGS. 4, 5 and 14 as surface 104 while the top surface of section 103 of connecting member 101 is designated as surface 105. As is apparent from an inspection of FIG. 4 reduced thickness section 103 of connecting member 101 extends from section 102 on the left side of FIG. 4 to 102A on the right side of FIG. 4.

A groove 106 is cut into connecting member 101 at a location equidistant between surface 104 and 104A but offset from the longitudinal axis defined by rod 163 that is best visible in FIG. 5. A metal toothed rack 107 is fixedly fastened within groove 106 with the teeth positioned upwardly as shown in FIG. 4. It is noted that the uppermost surface of the teeth of rack 107 is flush with surface 105 of the reduced thickness section 103 of connecting member 101.

A block C-shaped lateral track end pivoting member 110 provides an inverted T-shaped slot within which reduced section 103 of connecting member 101 is snugly but slidably gripped. The lateral track member 110 is visible in the left-hand portion of FIG. 1 and the cooperation of lateral track member 110 and portion 103 of connecting member 101 is particularly visible in FIG. 6A. With particular reference to FIG. 5, a notch 111 and a notch 112 are cut or formed in the uppermost portion 113 of track 110 at a point equidistant between surfaces 104 and 104A. Both of these notches pass through the entire thickness of the topmost portion of flange 110, such portion being designated as element 113. These notches provide bearing surfaces for rod 114 which is attached to the lateral control knob 115. Pinion 116 is securely attached to rod 114 so that when the rod is placed in notches 111 and 112, pinion 116 will engage rack 107 in groove 106 of the base member 101.

Although track 110 may pivot around an axis parallel to and midway between arms 150 and 150A in a manner to be explained below, it is noted that track is rigidly attached to the camera bed insofar as lateral or side movement is involved. Control knob 115 and its pinion 116 are fixed relative to track 101 because rod 114 is firmly placed in notches 111 and 112. Turning knob 115 will in turn rotate pinion 116 and, as rack 107 is engaged by rotating pinion 116, the entire connecting member 101 (as well as the two upstanding arms 150 and 150A and the plate carried by these arms) will shift laterally from side to side depending on the direction in which thumbscrew 115 is turned.

The front lens carrying portion of the camera shown in FIG. 1 is shifted to the left in track 110 and the film carrying portion at the rear of the camera is shown shifted to the right in the rear track that corresponds to the front track numbered 110. As is apparent from an inspection of the rear portion of the camera, a slot 120 must be cut or formed at the base of arms 150 and 151 so that sections 113 of track 110 may pass completely through portion 102 of base connecting member 101 and the lowermost portion of posts 150 and 150A. The groove 120 is formed such that the lower surface of the groove is on the same plane as surface 105 of connecting member 101. Thus, the lower surface of part 113 of track 110 is in contact with surface 105 throughout the greater part of its contact with section 103 of connecting member 101, yet portion 113 of the track may freely pass along the continuation of the groove designated as 120.

Support frame base member cap 130 is an elongated rectangularly shaped cap of a length equivalent to the distance between surfaces 104 and 104A of connecting member 101 and of a width equivalent to the width of sections 102 and 102A of connecting member 101. Cap 130 may be seen in cross section at two separate locations in FIGS. 6 and 6A. FIG. 6 is taken along section line 6-6 of FIG. 4 and, at that point, cap 130 has an undersurface 131 that will clear rod 114 when cap 130 is positioned on and fastened to connecting member 101. Surface 131 must be elevated above rod 114 to provide adequate clearance as the entire support frame assembly shifts later-ally from side to side in response to rotation of thumb-screw 115. Cap 130 is somewhat thicker when viewed along section line 6A-6A in FIG. 4. Surface 132 of cap 130 actually contacts section 103 of connecting member 101, and surface 132 of cap member 130 and surface 105 of connecting member 101 will be contacting one another when screws 133 are employed to fasten the cap to the connecting member.

The differences in thickness of cap 130 that are evident as surface 131 changes to surface 132 present a step face 134 and 134A particularly visible in FIG. 4. These surfaces engage limit stops 117 and 118 which are positioned adjacent the sides of groove 112, and this engagement limits the extent of lateral movement of the entire support assembly.

A slot 135 extends the full length of cap 130 to provide a clearance space for rod 163 that is operatively associated with the height extending mechanism of arms 150 and 150A. Note that groove 135 is visible in both FIGS. 6 and 6A. Additionally, a second groove 136 is cut longitudinally along a portion of the underside of cap 130 and is of such a size and location as to accommodate the top portion of pinion 116. Groove 136 is particularly visible in FIG. 6, and FIG. 4 illustrates the relative longitudinal length of groove 136 relative to connecting member 101. It can be seen that the length of groove 136 is substantially equal to the length of groove 106 that was formed in connecting member 101 to accommodate rack 107.

As is apparent from an inspection of FIGS. 5 and 6, the undersurface 131 of cap member 130 is in sliding contact with the top surface of portion 113 of lateral track 110. In the discussion of groove 120 above, it was pointed out that the lower surface of groove 120 was in the same plane as surface 105 of connecting member 101. In like manner, the upper portion of groove 120 will be in the same plane as surface 132 of cap 130 when cap 130 is firmly fastened in place and in contact with surface 105 by means of screws 133. Thus, in the area measured between the surface 104 and 104A a groove is defined between surface 105 and surface 131 that is of such a size as to slidingly engage portion 113 of track 110.

To enable either the front plate assembly or the back plate assembly to swing or pivot in the directions shown by arrows I-J (FIG. 1), lateral track 110 is provided with a threaded shaft 139 that projects downwardly from the undersurface of the track. This threaded shaft passes through hole 141 formed through frame support member 140. Member 140 is generally shaped like an inverted U and presents a flat upper surface that supports track 103 and its associated frame work as well as either the front plate or the rear plate. Control knob 142 has a threaded hole in the center thereof that engages the threaded portion of shaft 139 after it passes through hole 141 in member 140. By loosening thumb-screw 142, the entire plate supporting frame may be swung about an axis midway between and parallel to arms 150 and 150A and passing through shaft 139. Once positioned, it is only necessary to tighten thumb-screw 142 to lock the entire assembly in place. With particular reference to FIG. 2, it is noted that the size of thumbscrew 142 must be chosen so that it does not interfere with knob 115.

Member 140 has a track following mechanism on each of its ends. As is best visible in the lower left portion of FIG. 3, this follower has two flanges 143, 144 that taper inwardly to provide a triangular track in the same manner that flanges 24 and 25 were formed on bottom rail 22. As previously described, front track 32 has a toothed rack 36 running along its upper edge. As is best visible in FIG. 8, element 140 is provided with an adjusting mechanism that includes control knobs 145 and 145A located on opposite sides of shaft 146 with the shaft passing through an appropriate hole formed in both ends of element 140. Pinions 147 and 147A are securely attached to the shaft at locations corresponding to racks 36 and 36A and appropriate clearances are formed in element 140 to permit the pinions to rotate freely.

In the event that the track illustrated in FIG. 9 is employed in the camera, appropriate knobs and pinions would operate in the same fashion to cooperate with rack 36A. It is noted that flanges 143A and 144A are shaped similarly to 24A and 25A in order to provide a T-shaped track for rail 32A.

Upstanding frame support post 150B (FIG. 14) is a modified frame supporting post that encloses and protects finger knobs 164B and 165B. The mechanism for raising and lowering the upper portion 149B of arm 150B is the same as the mechanism described above with reference to FIG. 4.

A modified finger knob is shown in FIG. 15. Element 180 represents a surface on the camera which would be determined by the location of the knob itself. For example, if the knob shown in FIG. 15 represented knob 164 then element 180 would be the surface of gear chamber covering plate 155. Portion 181 of the finger knob of FIG. 15 may be formed in any convenient shape and of any relatively rigid material such as metal or the like. Element 182 is a resilient rubber or plastic friction disc that is positioned between finger engaging portion 181 of the knob and surface 180. The knob itself is joined to its controlled pinion by spline shaft 183. Shaft 183 is keyed to part 181 of the knob in some manner such as metal notches or teeth along the exterior longitudinal surface of the shaft and a complementary-shaped socket or hole in element 181. Thus, element 181 is capable of sliding along rod 183 in a longitudinal direction yet rotation of section 181 of the knob will result in a rotation of rod 183. At its outermost end rod 183 is turned down to a slightly reduced diameter and is threaded on its exterior surface. This exterior surface is engaged by a locking member 185 which is attached to shaft 184 by means of screw 186 that passes into a tapped hole formed at the center of shaft 184.

After the knob is used to position the appropriate part of the camera, the knob may be locked in place by simply rotating locking element 185. Rotation of element 185 on the screw threads formed on portion 184 of shaft 183 will cause section 181 of the knob to shift longitudinally (to the left in FIG. 15) along shaft 183. This slight shifting will squeeze the resilient member 182 between the mating surface of section 181 of the knob and the mating surface of element 180 on the camera body. To unlock the knob, it is only necessary to rotate locking element 185 relative to part 181 of the knob in a direction that will permit the knob to shift to the right (as viewed in FIG. 15) and release pressure on the friction washer 182.

The lens of my camera is carried by front plate 200. This front plate is attached to the plate support arms by means of tab 168 and pivots 167 in a manner previously described. A large round hole is cut in the center of the front surface 201 of plate 200 and a lens disc mounting ring is provided to attach lens disc 203 to front plate 200. A lens accommodating hole is cut into lens disc 203 and lens flange 204 is fastened therein. This lens flange is of standard size and permits an easy exchange of lens 205 for another standard size lens. Lens disc 203 is mounted for a full 360° rotation about an axis perpendicular to front surface 201 of front plate 200. Lens disc mounting ring 202 may attach disc 203 to front plate 200 in any conventional manner that will permit rotation or, alternatively, front surface 201 of front plate 200 may have a circular groove cut into the inner periphery of the hole cut for the disc such as the groove visible in FIG. 10.

Lens disc control button 206 may be positioned so that it extends from the top surface of front plate 200. The control button may engage the lens disc in any conventional manner such as a simple gear linkage or a simple friction drive. Rotation of control button 206 will result in a concomitant rotation of lens disc 203. With reference to FIG. 1, the button 206 may be movable in either direction so that lens disc can rotate in either directions indicated by arrows K-L.

Button 206 may have a flexible cable fixedly attached thereto that extends to the rear of the camera. As is visible in FIG. 12, cable C may pass through the back side of front plate 200 through conventional bearing means. A turning motion of cable C by the photographer will allow the adjustment of the lens disc from the rear of the camera while the ground glass is being observed.

A modified version of front plate 200 is indicated generally by the numeral 200B in FIGS. 10 and 11. Elements of front plate 200B that are common to the front plate visible in the other figures are indicated by like reference numerals followed by the letter "B."

Front surface element 301 of front plate 200B is similar to front surface 201 of front plate 200 except for the means by which lens disc 203B is rotatable mounted therein. A groove 302 is provided around the circumference of the hole cut through front surface 301 of a size and depth that will accommodate the edge of disc 203B. Front surface element 301 may be split to facilitate assembly of the element and the disc and care must be taken to assure that the split area admits no light once the elements are assembled.

A spacer ring 303 is located to the rear of front surface element 301 and is followed by bellows attaching frame 304. This frame is attached to the front plate frame 305 by means of small screws. The heads of the screws are inside the bellows and are accessible by removing the ground glass on the rear plate. A similar bellows attaching frame 304B is employed to fasten the bellows to the back plate and is visible in FIG. 1.

Centrally located on disc 203B is pivot pin 306 and attached thereto, on the side of disc 203B facing the interior of the bellows, is filter disc 307. Filter disc 307 is capable of rotation about pivot pin 306 independently of the rotation of lens disc 203B. A number of filters 307A, 307B, etc., are positioned about the outer edge of filter disc 307 (FIG. 11) at a distance from pivot pin 306 that corresponds to the location of lens 205B relative to pin 306. In this manner, the image passing through the lens may also pass through a filter before it strikes the film or ground glass. One of the filters may be a natural filter and three more of the filters may be red, green and blue filters for use in color separation work and lithiographic work. Another filter location may simply be a hole cut through the filter disc for those applications requiring no filter at all. As previously mentioned, the modified camera front plate 200B is particularly useful in large process cameras.

Both the lens disc 203B and 307 may be driven by friction wheels 308 and 309 that are rotatably mounted in frame 305 and in contact with the two discs. Wheel housing 310 protects the friction wheels and provides a mounting means for driving wheels 311 and 312. The periphery of driving wheel 312 contacts the periphery of friction wheel 309 and a similar relationship exists with wheels 311 and 308. Cables similar to cable C visible in FIG. 12 are attached to driving wheels 311 and 312 and extend to the rear of the process camera to facilitate remote control from the film end of the camera. Similar cables or other conventional driving means may be attached to the various controls that move the front and rear plates along the tracks on the process camera bed.

My view camera may be folded in a manner visible in FIG. 13. Tripod mount 10 is moved to the back track assembly 50, with slots 15 and 15A accommodating knobs 14 and 14A, the front and back plates, 200 and 400, respectively, may be positioned on the back track assembly 50, and the front track assembly 20 may be folded upwardly at hinge 80. Such a folded configuration facilitates transport of my camera from job to job and the flared portion of the rear plate protects the flexible bellows.

The ground glass and film carrying assembly 401 (FIG. 2) that is attached to the back plate of my camera is conventional although it is noted that the rear or back plate being smaller than the front plate and the rear plate frame member being flared, both as previously described, constitute a portion of my invention.

The flared configuration of the rear plate frame 402 is best visible in perspective in FIG. 1. All four sides flare outwardly in the direction of the front plate and allow the bellows to be distorted without bunching in a manner that will obscure a portion of the image. An inspection of FIG. 2 will indicate that the two arms 150, 150A that are attached to the flared rear plate frame 402 are mounted very near edge 403 of rear plate frame 402. This relationship will permit the bottom part of frame 402 (FIG. 2) to be pivoted toward the front of the camera an appreciable amount yet still provide clearance past arms 150, 150A to insert a film plate. This feature is useful when film holder 401 is positioned on the rear plate in a manner to allow the film to be inserted from the side of the rear plate rather than from the top of the rear plate. Because the image area of the film is rectangular rather than square, the film holder 401 is often moved to allow "top load" or "side load" of the film, depending on the needs of the particular object being photographed.

If desired, small "bubble levels" may be attached to the frame of my camera as an aid to the photographer when he is leveling the camera for some types of photography. As an additional convenience, small limit stops may be associated with the tracks on the camera bed to prevent the inadvertent disengagement of the track sections during adjustment thereof.

It should be apparent that the present invention may be embodied in other specific forms without departing from the spirit or essential attributes thereof, all of which are intended to be encompassed by the appended claims.

I claim:

1. In a view camera having a camera bed with track means, a front plate with lens mounting means thereon, a rear film and ground glass carrying plate, a bellows attached to said front plate and said rear plate and means on said camera bed to facilitate independent movement of said front plate and said rear plate along said track means, the improvement comprising said front plate being larger than said rear plate and said bellows being tapered to become smaller in the direction of said rear plate, the peripheral portion of said rear plate being a frame of flared configuration, the flare of said configuration being outwardly in a direction toward said front plate and said lens mounting means being a circular lens disc mounted on said front plate for rotation about an axis perpendicular to said plate with a lens connecting hole passing through said disc and offset from the center of said disc whereby a camera lens may be mounted in said hole.

2. The camera of claim 1, further comprising a tripod mount member for mounting said camera on a tripod and additional track means on said camera bed cooperating with said tripod mount member wherein said entire camera may be moved relative to said mount member along said additional track means.

3. A view camera comprising a camera bed having a front track assembly and a back track assembly, each of said track assemblies having a base track assembly and an intermediate extendible track assembly, a front plate with lens mounting means thereon, a rear film and ground glass carrying plate, and two plate support frames, one of said frames being adapted to attach said front plate to one of said intermediate extendible track assemblies and the other of said frames being adapted to attach said rear plate to one of said intermediate extendible track assemblies, and wherein said lens mounting means on said front plate comprises a circular lens disc mounted on said front plate for rotation about an axis perpendicular to said plate and a lens accommodating hole passing through said disc and offset from the center of said disc, and including a filter disc mounted for rotation about the same axis as said lens disc, said filter disc having a plurality of filter accommodating holes passing therethrough at positions permitting alignment between a given filter hole and said lens accommodating hole, and wherein two friction wheels are mounted for rotation on said front plate, the periphery of one friction wheel being in contact with said lens disc and the periphery of the other friction wheel being in contact with said filter disc, and said friction wheels having driving means associated therewith and controllable from a position adjacent said rear plate whereby the photographer may control the position of both of said discs from the rear of the camera.

4. In a view camera having a camera bed, a front plate with lens mounting means thereon, a rear film and ground glass carrying plate, and manually operable means to adjust the position of said plates relative to said camera bed, the improvement comprising said manually operable means being a finger knob mounted on a shaft, said finger knob having a finger engaging portion on the end of said shaft, a resilient friction disc adjacent the end of said finger engaging portion displaced from said end shaft, and a locking member adjacent the other end of said finger engaging portion, said finger engaging portion being slidable along the longitudinal extent of said shaft upon rotation of said locking member whereby said friction disc is compressed between said finger engaging portion of said knob and the member upon which said manually operable means is mounted.

5. A view camera comprising a tripod mount member, a camera bed having track assembly means with two parallel side rails rigidly attached to each other by cross-member means, said track assembly means having track means thereon that cooperate with camera bed moving means associated with said tripod mount member so that said camera bed is movable with respect to said tripod mount member, a front lens carrying assembly and a rear ground glass and flim carrying assembly, both said front and rear assemblies having a depth track following member that is movable along said two parallel side rails, lateral track means pivotally attached to said depth track following member to be movable in a plane parallel to the plane of said two parallel side rails, a support frame base member carried by said lateral track means and movable with respect thereto, and an upstanding support arm attached to each end of said support frame base member to be perpendicular to said plane of said two parallel side rails, each of said support arms including a lower portion with a height extending arm chamber therein and an upper portion with a height extending arm in telescoping relationship with said chamber and movable with respect thereto.

6. The camera of claim 5 wherein said track assembly means comprises a front track assembly and a rear track assembly, at least one of which has a base track and an intermediate extendible track slidably mounted on said base track, and rack and pinion means associated with said intermediate track and said base track to facilitate the extension of said one track assembly.

7. The camera of claim 6 wherein said front track assembly is hinged to said rear track assembly whereby both said front lens carrying assembly and rear ground glass and film carrying assembly may be positioned on said rear track assembly and said front track assembly may be folded relative to said rear track assembly.

8. The camera of claim 5 wherein said front lens carrying assembly includes a front plate having a circular lens disc mounted for rotation about an axis perpendicular to said plate, and a lens accommodating hole passing through said disc and offset from the center of said disc.

9. The camera of claim 8 including a filter disc mounted for rotation about the same axis as said lens disc, said filter disc having a plurality of filter accommodating holes passing therethrough at positions permitting alignment between a given filter hole and said lens accommodating hole.

10. The camera of claim 8 wherein said front plate includes means associated with said disc permitting remote control of the rotation of said disc.

11. The camera of claim 5 wherein said rear ground glass and film carrying assembly includes a rear plate having a frame portion with a flared configuration, said flare being outwardly in a direction toward said front plate whereby greater clearance is provided for a flexible bellows joining said front and rear assemblies.

12. The camera of claim 5 wherein said front assembly includes a first bellows mounting means thereon, said rear assembly includes a second bellows mounting means thereon, and said first mounting means is larger than said second mounting means whereby a flexible bellows adapted to be attached to both said mounting means tapers to become smaller in the direction of said rear assembly.

* * * * *